United States Patent [19]

Bednar

[11] Patent Number: 5,121,362
[45] Date of Patent: * Jun. 9, 1992

[54] GEOPHONE CHECKER

[75] Inventor: Eugene D. Bednar, Houston, Tex.

[73] Assignee: Shell Oil Company, Houston, Tex.

[*] Notice: The portion of the term of this patent subsequent to Mar. 10, 2009 has been disclaimed.

[21] Appl. No.: 108,873

[22] Filed: Oct. 15, 1987

[51] Int. Cl.$^5$ .............................................. H04B 17/00
[52] U.S. Cl. .................................................... 367/13
[58] Field of Search ........................ 367/13; 73/1 DV

[56] References Cited

U.S. PATENT DOCUMENTS

| | | | |
|---|---|---|---|
| 4,015,202 | 3/1977 | Fredriksson et al. | 367/13 |
| 4,134,097 | 1/1979 | Cowles | 367/13 |
| 4,320,468 | 3/1982 | Montross | 367/13 |
| 4,757,706 | 7/1988 | Dogget | 367/13 |

*Primary Examiner*—Daniel T. Pihulic

[57] ABSTRACT

A checker is provided that attaches to a seismic cable and provides an audible output in response to a mechanical impulse when the polarity of the geophones in that cable are correct. Methods for checking geophones and their polarity and alternative apparatus are provided.

9 Claims, 3 Drawing Sheets

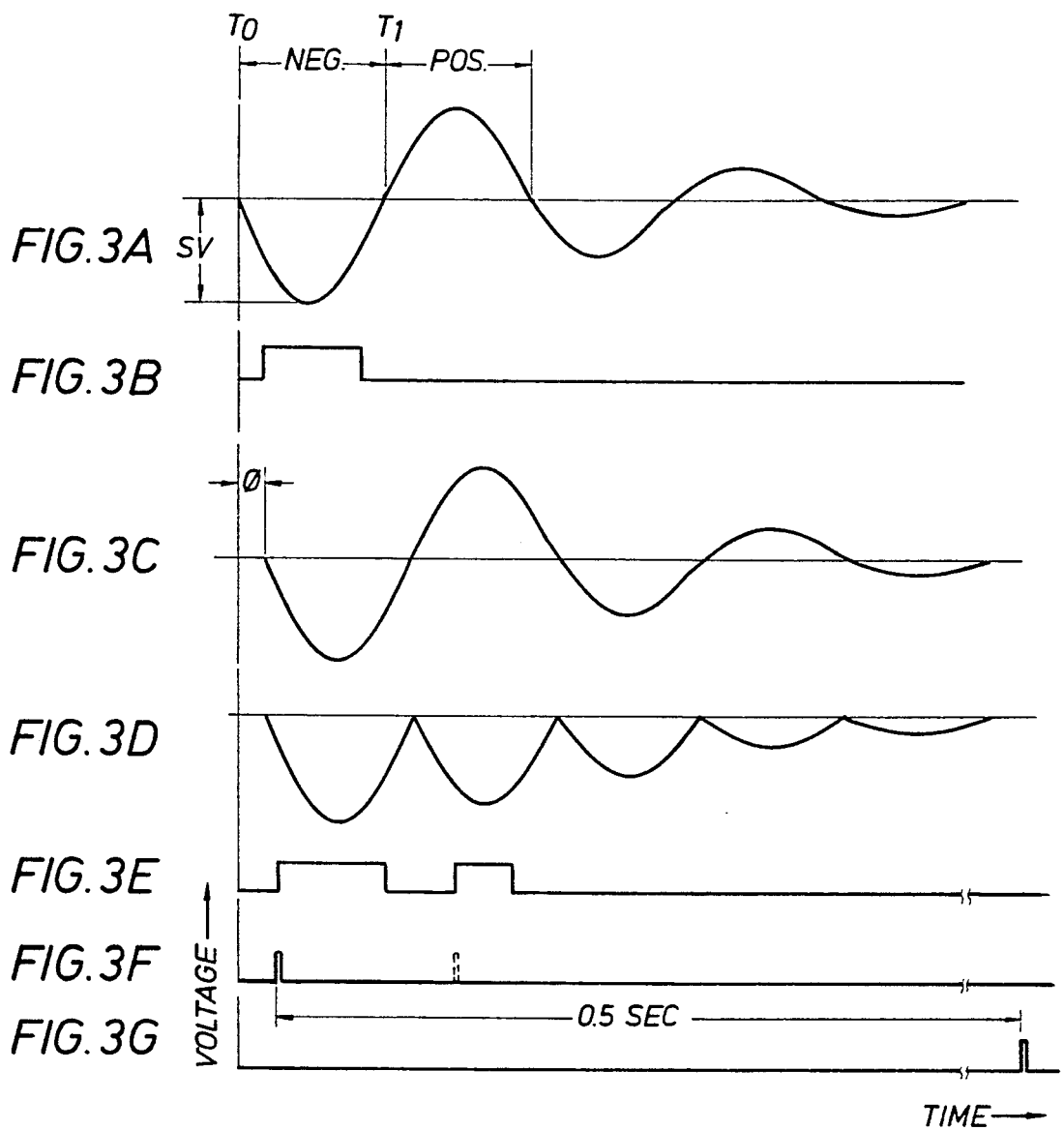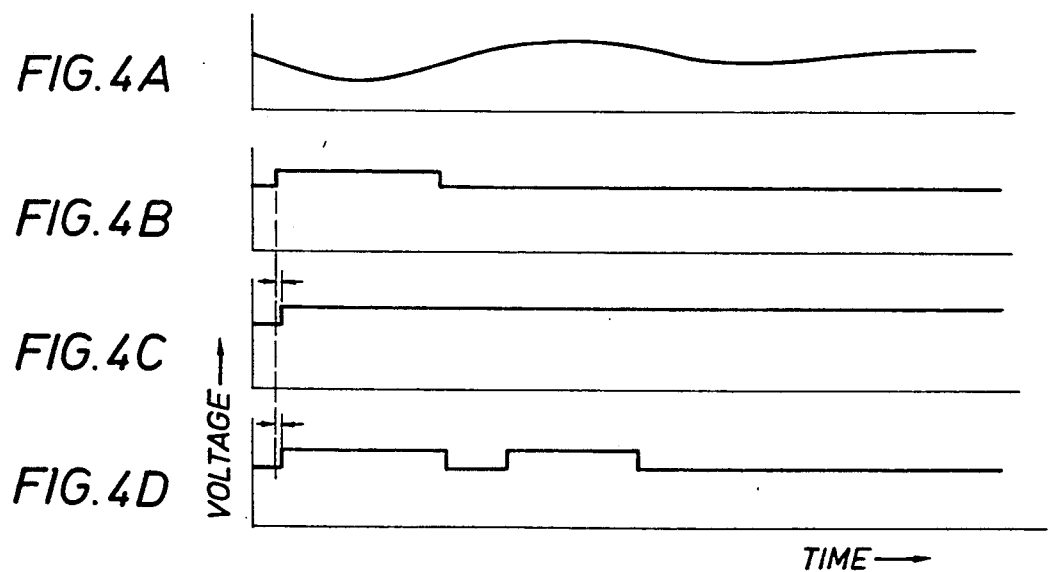

GEOPHONE CHECKER

CROSS-REFERENCE TO SIMULTANEOUSLY FILED RELATED APPLICATION

"Hydrophone Checker", Eugene D. Bednar, Ser. No. 108,874, filed Oct. 15, 1987, pending.

BACKGROUND OF THE INVENTION

This invention relates to methods and apparatus for determining the polarity of a geophone, and more particularly, relates to methods and apparatus for determining the polarity of geophones mounted in seismic cables.

A conventional moving coil geophone consists of a coil of wire wound on a core and suspended by springs which allow the coil to move either up and down (for a vertical geophone) or from side to side (for a horizontal geophone) within the radial magnetic field of a center pole piece and a magnetically permeable case. Wires from the ends of the coil are connected to external terminals of the geophone, and for one convention one terminal is marked with a dot of paint or a plus sign to indicate a positive polarity. For this convention, positive voltage is produced on the plus terminal when the geophone coil is displaced downward (for a vertical geophone) with respect to the case, and the voltage is proportional to the relative velocity of the coil with respect to the case. Similarly, for one convention, a horizontal geophone will produce a positive voltage on its plus terminal when its coil is displaced to the right with respect to the case (when viewed from the front) and again the voltage is proportional to the relative velocity between the coil and case. It is also possible to combine a vertical and one or two perpendicular horizontal geophones in a single case or mounting to provide a multicomponent geophone. The term "geophone" without a modifier is used herein to mean a vertical, horizontal, and/or multicomponent geophone. Any mechanical impulse that is applied to the geophone along its sensing axis will normally generate a detectable voltage.

In seismic exploration the use of an array of geophones in a cable to record the ground motion at various survey locations is customary. The geophones may be connected in series, parallel, or a combination of series and parallel, depending upon acquisition factors. Correct polarity of each geophone is important so that the detector array response is the true sum of all the geophone elements. Detection of individual geophone polarities once assembled in a seismic cable, i.e. an array, is at best a difficult problem.

Traditionally, geophone polarity for each vertical geophone has been determined with the use of a zero center scale galvanometer (or a microammeter) in an enclosed facility used to assemble or repair geophone cables. A vertical geophone is positioned on its side and connected to the galvanometer. When the geophone is moved to its upright position, the galvanometer deflects either plus or minus A positive deflection of the galvanometer should occur if the geophone plus terminal is connected to the plus terminal of the galvanometer. If the positive geophone terminal is incorrectly marked, the galvanometer will have a negative deflection. Also, if the positive geophone terminal is incorrectly marked the marking must be changed to reflect the actual positive terminal. A horizontal geophone may be similarly checked and a multicomponent geophone ma have each component separately and individually checked in a similar manner.

Further, an oscilloscope may be used to replace the galvanometer and the transient displacement of the electron beam (i.e. output voltage of the geophone) indicates the polarity when a vertical geophone is moved upright from its side. Alternatively, a vertical geophone may be mechanically impulsed, i.e. tapped lightly on its top, and the output voltage observed to determine polarity. If a digital storage oscilloscope or other recording device is used, then the transient deflection can be stored for later analysis. However, the use of oscilloscopes in the field to check the polarities of geophones installed in cables is not very practical due to the size and bulk of an oscilloscope, as well as its need for power.

Both of these methods for determining the proper polarity of geophones require extreme care in handling, a lot of judgement, and attention to detail by the observer. In addition, the testing of geophones for polarity once installed in cables laid out for field acquisition is not practical using these methods.

These and other limitations and disadvantages of the prior art are overcome by the present invention, however, and methods and apparatus are provided for determining and/or checking a geophone for proper polarity.

SUMMARY OF THE INVENTION

In a preferred embodiment of the present invention, methods and apparatus are provided for determining and/or checking the polarity of a geophone, whether or not it is installed in a seismic cable, either in the field or in a repair facility. The term "geophone" without a modifier is used herein to mean a vertical, horizontal, and/or multicomponent geophone. More particularly, the presently preferred apparatus of the present invention employs a preamplifier to amplify the geophone signal and then the amplified geophone signal from the preamplifier is split and connected to both a phase shifter (delay) and a first level detector. The output of the phase shifter is rectified and provided via a second level detector as one input to a comparator with the other input to the comparator being that of the first level detector. The comparator determines if the polarity of the geophone markings is correct from its two inputs. The comparator in turn is interconnected with an adjustable timer and output switch or amplifier. The timer determines the amount of time for which an output signal is produced from the output amplifier in response to a signal from the comparator that the polarity is correct. The output amplifier is in turn connected to an output device, which may be an audible and/or visual device, for providing an appropriate signal or indication only when the polarity of the geophone is correct. The output device may also have an adjustable signal level for adjustment of "volume" or "brightness" based upon use in the field or an enclosed facility. The presently preferred apparatus of the present invention will determine the polarity of a geophone regardless of its damping, i.e. both lightly damped and heavily damped geophones ma be tested by this apparatus. Other, simpler embodiments may be employed to determine the polarity of heavily damped geophones.

The presently preferred method of the present invention generates an output voltage from a geophone by an appropriate mechanical impulse, amplifies this voltage, automatically compares the polarity and signal of the geophone with the expected polarity and signal of a similar geophone having the proper polarity receiving the same mechanical impulse, and generates an output signal indicative of correct polarity and/or signal of the tested geophone. This may be accomplished by taking the amplified geophone signal and dividing it into two signals. One signal is phase shifted (delayed), rectified and its amplitude compared to a first preselected value; the second signal's amplitude and polarity is compared to a second preselected value and preselected polarity. If the amplitude of the first signal exceeds the first preselected value, a third signal is generated. If the amplitude of the second signal exceed the second preselected value and has the same polarity as the preselected polarity, a fourth signal is generated. These third and fourth signals are compared and if both are present, a fifth signal is generated. The fifth signal causes a final output signal which may be an audible and/or visual signal, for a preselected time.

Alternatively, a method of the present invention generates an output voltage from a geophone by an appropriate mechanical impulse, amplifies that output voltage, and then determines the polarity of that voltage. The polarity of the voltage is compared with the polarity expected from the direction of the mechanical impulse, and if correct (i.e. the same polarity), automatically generates a signal. This signal causes a final signal for a preselected time.

It is an object of the present invention to provide a simple and portable electronic circuit to quickly and accurately determine and/or check geophone polarity either individually or within an array with minimal attention or judgement by an operator.

It is also an object of the present invention to provide a method for determining the polarity of a geophone relative to its indicated or assumed polarity with minimal attention or judgement by an operator.

It is a specific object of the present invention to provide a method for determining the polarity of a geophone by generating an output signal from such a geophone by mechanically impulsing such a geophone in a predetermined direction and manner, comparing the output signal and polarity thereof with the expected signal and polarity from such a geophone having a preselected polarity impulsed in the same manner, and generating an output responsive to the comparing step when the output signal and polarity are substantially the same as the expected signal and polarity for such a geophone.

These and other features and objects of the present invention will become apparent from the following detailed description, wherein reference is made to the figures in the accompanying drawings.

IN THE FIGURES

FIGS. 3A-3G depict various expected wave forms from a heavily damped geophone at various points of the circuitry depicted in FIG. 2.

FIGS. 4A-4D depict representations of various measured signal levels from a heavily damped geophone at selected points of the circuitry illustrated in FIG. 2 from an actual test.

DETAILED DESCRIPTION

Figure 1:
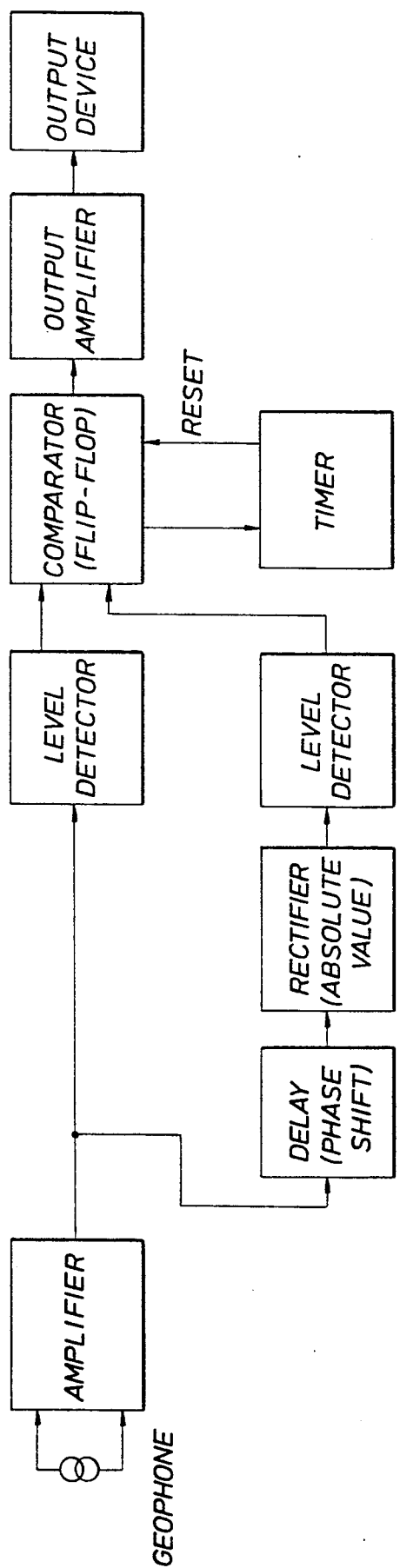
FIG. 1 is a simplified block diagram of a geophone polarity detector of the present invention.

Referring now to FIG. 1, there may be seen a simplified block diagram of a presently preferred geophone checker of the present invention. The term "geophone" without a modifier is used herein to mean a vertical, horizontal, and/or multicomponent geophone. More particularly, there may be seen a geophone appropriately connected to a geophone checker block diagram in a manner consistent with either the geophone's marked polarity or an assumed polarity. This geophone may be either heavily or lightly damped. The geophone checker is seen to be initially connected to the geophone by an amplifier block. This amplifier is used to amplify the output voltage of the geophone and should be adjustable to provide various selectable amplifications or provide automatic amplification through AGC or non-linear amplification techniques. In general, the geophone signal should be amplified sufficiently to provide a large enough signal for any subsequent level detector with the amount of amplification depending upon the sensitivity of the geophone, without amplifying any noise (particularly for deployed geophones) to the point where the noise will exceed the thresholds of a level detector. The amplified geophone signal from the amplifier is interconnected with both a (first) level detector block and a delay (or phase shift) block.

The time delayed, amplified geophone signal from the phase shift block is supplied as the input to a rectifier block whose output is in turn supplied as the input to a (second) level detector block. The outputs of the first and second level detector blocks are provided as inputs to a comparator block or flip-flop. The comparator block in turn activates an output amplifier that energizes an output device, which may be an audible and/or visual device, only if the geophone polarity is correct. The output level of the output device may be adjustable. The output device is energized for a preselected period of time, which is determined by a timer block, which resets the comparator when the preselected period of time has elapsed; the timer block is preferably adjustable to provide various preselected periods of time. Alternatively, the output amplifier may be eliminated and the comparator may directly activate the output device. Alternatively, the timer block may be part of the output device.

The first level detector block provides a constant voltage signal of a predetermined polarity to the comparator when the amplified geophone signal has a first preselected polarity and when the geophone signal exceeds a first adjustable preselected threshold voltage level. For example, for an inverting level detector the output polarity may be positive if the input polarity is negative, although any other desired combination of polarities may be employed. For heavily damped geophones, this polarity and threshold may be selected to provide an output signal only during the high amplitude portion of the initial half cycle of the geophone signal when the geophone case is mechanically impulsed in a preselected direction or manner (i.e., by tapping the top or side of the geophone case), but not when personnel are walking by a deployed geophone.

For lightly damped geophones, where subsequent half cycles of a geophone signal may be of nearly the same amplitude as the preceding half cycle or the initial half cycle, it is not possible to adjust the polarity and threshold level of the first level detector to provide an output signal only for the initial half cycle; instead, the first level detector will provide an output signal for the initial half cycle and any subsequent half cycles of the same polarity that are above the threshold voltage, which may be many such cycles. For example, see FIG. 3A for an amplified geophone signal and FIG. 3E for corresponding level detector output, which although they are for a heavily damped geophone and which are discussed later herein, illustrate multiple cycles.

This threshold, once selected for a particular type of geophone, may also be employed as a quality control check to ensure that all geophones of that type reach that amplitude when mechanically impulsed in the predetermined manner (i.e. on the top or side of the geophone case, as appropriate) to ensure the signals from the geophone coils are similar and that the coils are in good working order. The mechanical impulse may be as simple as lightly tapping the top (for a vertical geophone) or the side (for a horizontal geophone) of a geophone with a pen or pencil, or as complex as a special weight slidably disposed on a graduated rule to provide a constant repeatable force, i.e. a calibrated drop or spring-loaded weight.

The delay block delays the amplified geophone signal a preselected amount of time, which is preferably adjustable. The rectifier block converts the delayed, amplified geophone signal into an absolute value signal of preselected and adjustable polarity; i.e., the positive and negative half cycles of the geophone signal are converted to all positive or all negative half cycles of the same shape and amplitude as the unrectified signal. See for example, FIG. 3C for a delayed signal and FIG. 3D for a corresponding rectified signal, which are for a heavily damped geophone and which are discussed later herein. The absolute valued, delayed, amplified geophone signal is then provided as the input to a second level detector block. This second level detector block may have its input and output polarity preselected and its threshold at a second preselected, adjustable value, as discussed hereinbefore for the the first level detector.

The output signals from the first and second level detectors are provided as inputs to a comparator block, where the polarities of the level detectors for the initial half cycle of geophone signal following an impulse may be compared. Again, the output polarities of the level detectors may be either positive or negative when their input polarity is appropriate (desired) depending upon the actual circuitry employed or the desires of the operator. See for example, FIG. 3B for the first level detector output signal and FIG. 3E for the second level detector output signal, which are for a heavily damped geophone and which are discussed later herein. Preferably, if the two signals from the first (FIG. 3B) and second (FIG. 3E) level detectors have the same polarity, the comparator may provide a signal to an output amplifier and a timer; if the two signals from the level detectors have differing polarities, the comparator may provide n signal to the output amplifier and timer. For example, where the comparator is a flip-flop, the output signal from the first level detector may be used as a "D" input to the flip-flop and the (delayed) output signal from second level detector may be used as a "clock" input to the flip-flop; if the two output signals of the level detectors have the same polarity the flip-flop will change state and activate an output amplifier and timer. The "clock" input must be delayed relative to the "D" pulse for the flip-flop to work properly. Thus the need to delay the signal to the second level detector for the embodiment of FIGS. 1 and 2. However, for comparators that are not a flip-flop or do not employ a flip-flop, this delay may be unnecessary, and if so, the delay block may be eliminated. For lightly damped geophones, it is also necessary to have the comparator reject all but the initial half cycle of the geophone signal, this may be accomplished by locking in the first signals or by locking out any subsequent signals.

The output amplifier, in turn activates an output device, which may be an audible and/or visual device, until the comparator signal is removed. The output device may have adjustable output level. The timer allows the comparator to provide its output signal for a preselected, adjustable time before resetting the comparator, and thus removing the comparator signal. Again, the comparator may directly activate the output device which may also contain the timer.

For heavily damped geophones, when the geophone's electrical and mechanical characteristics are well known, it is possible to eliminate the delay line, rectifier, second level detector and comparator blocks of FIG. 1. That is, by appropriate adjustment of the first level detector and preamplifier gain, the first level detector provides an output signal to turn on the output amplifier (or output device directly) and a timer when the amplified geophone signal has the proper polarity for a mechanical impulse in a preselected direction or manner to the geophone case and when the amplified geophone signal exceeds a preselected amplitude selected to include only the first half cycle of the geophone signal. See for example, FIG. 3B for the output of the first level detector based upon the signal depicted in FIG. 3A. The timer serves to reset the output amplifier after a preselected, adjustable time period, that commences with the turning on of the output amplifier. As this embodiment is simpler than that of FIG. 1, it is presently preferred when heavily damped geophones are to be checked for polarity. However, the embodiment of FIG. 1 is preferred for checking the polarity of geophones whose damping is unknown, i.e. may be either heavily or lightly damped.

The presently preferred method of the present invention generates an output signal from a geophone by an appropriate mechanical impulse in a predetermined direction or manner, optionally amplifies this signal, compares the polarity and signal of the geophone with the expected polarity and signal of a similar geophone having the proper polarity receiving the same mechanical impulse, and generates an output signal indicative of correct polarity and/or signal of the tested geophone. This may be accomplished by taking the amplified geophone signal and dividing it into two signals. The first signal is phase shifted (delayed), rectified and its amplitude compared to a first preselected value, the second signal's amplitude and polarity is compared to a second preselected value and preselected polarity. If the amplitude of the first signal exceeds the first preselected value, a comparison or third signal is generated. If the amplitude of the second signal exceeds the second preselected value and has the same polarity as the preselected polarity, a polarity dependent or fourth signal is generated. These third and fourth signals are compared and if both have the proper polarity, or if both are present, a fifth signal is generated. The fifth signal causes a final output signal, which may be an audible and/or visible signal, for a preselected time. Although it is presently preferred that the final output signal indicate correct polarity or signal, it is also possible to cause a final output signal only for incorrect polarity or incorrect signal.

Alternatively, a microprocessor having suitable memory may be programmed to serve as the delay line, rectifier, first and second level detectors, timer and comparator, or as a first level detector and timer, as appropriate. However, the output of the pre-amplifier must be digitized with an appropriate analogue-to-digital converter. Further, the microprocessor may also be programmed to compare any actual output signal of a geophone with a reference signal for that type of geophone to perform a quality control check of the type of geophone being tested and indicate the results of any such test in an audible and/or visual manner. The reference signal may be an appropriate stored signal resulting from a known good geophone of the type being tested; the reference signal may consist of the digitized voltage amplitude and polarity versus time. The comparison program may compare the actual signal with the reference signal and provide appropriate audible and/or visual signals, outputs or results (i.e. a strip chart comparison and analysis) if the two signals vary by more than a preselected amount in either amplitude or time, or both, i.e. the signals are not substantially the same, to indicate a defective geophone or a geophone with improper polarity. The comparison program may need to make adjustments for different amplification factors for the two signals.

Alternatively, a method of the present invention generates an output voltage from a geophone by a mechanical impulse in a predetermined direction or manner, amplifies that output voltage, and then determines the polarity of that voltage. The polarity of the voltage is compared with that expected from the known direction of the mechanical impulse, and if correct (i.e. the same polarity), generates a signal. This signal causes a final signal, which may be an audible and/or visual signal, for a preselected time.

The apparatus of the present invention may be employed in the field to individually determine or check the polarity of a geophone, or all the geophones, in a cable, before, during, or after any field repairs. It may also be used to determine and/or check the polarity of a geophone that is not in a cable. The geophone checker apparatus is connected to the wires of a geophone array at a station location. The seismic operator then mechanically impulses (as described hereinbefore) each geophone case one at a time until all geophones are verified by an appropriate audible and/or visual signal as being connected with proper polarity or any incorrectly wired geophone or geophones are isolated. The sound level of an audible device should be adjustable and be set loud enough to be heard several hundred feet away, making it possible to test any practical station array with the polarity apparatus at the take-out location. Each station array is tested in sequence until all stations of a geophone spread are verified. For vertical geophones, the operator may mechanically impulse the top of each geophone case, while for horizontal geophones, the operator may mechanically impulse the same preselected side of each geophone. For multicomponent geophones, each component is tested individually and separately as described hereinbefore.

The apparatus of the present invention may also be employed in repair facilities. In field offices where geophone strings are repaired it is customary to provide stands or fixtures to hold geophones in an upright position while silicone compounds are injected in the geophone cases to seal out moisture. This type of fixture is ideal for checking polarity with the apparatus of the present invention. The cable repair individual simply connects the geophone checker apparatus to each string and taps each geophone case one at a time until all geophones are verified as having connections with proper polarity by audible and/or visual signals, or any incorrectly wired geophone is isolated, as described hereinbefore. Again, the present invention may also be used to determine and/or check the polarity of a geophone that is not in a cable.

For example, a single geophone may have its polarity determined and/or checked. The individual geophone is connected to the geophone checker of the present invention in accordance with its indicated or assumed polarity. A mechanical impulse to the top of a vertical geophone or side of a horizontal geophone case set on a table or desk top will cause an output signal, which may be an audible and/or visual signal, if the marked or assumed polarity is correct. Again, the level of the output signal may be adjusted for the comfort of the operator in such a test room. Further, the same mechanical impulse when applied directly to the table or desk top will cause the same output signal for a vertical geophone. However, the same impulse applied to the bottom (underneath side) of the table or desk top will result in no such signal for a vertical geophone.

Figure 2:
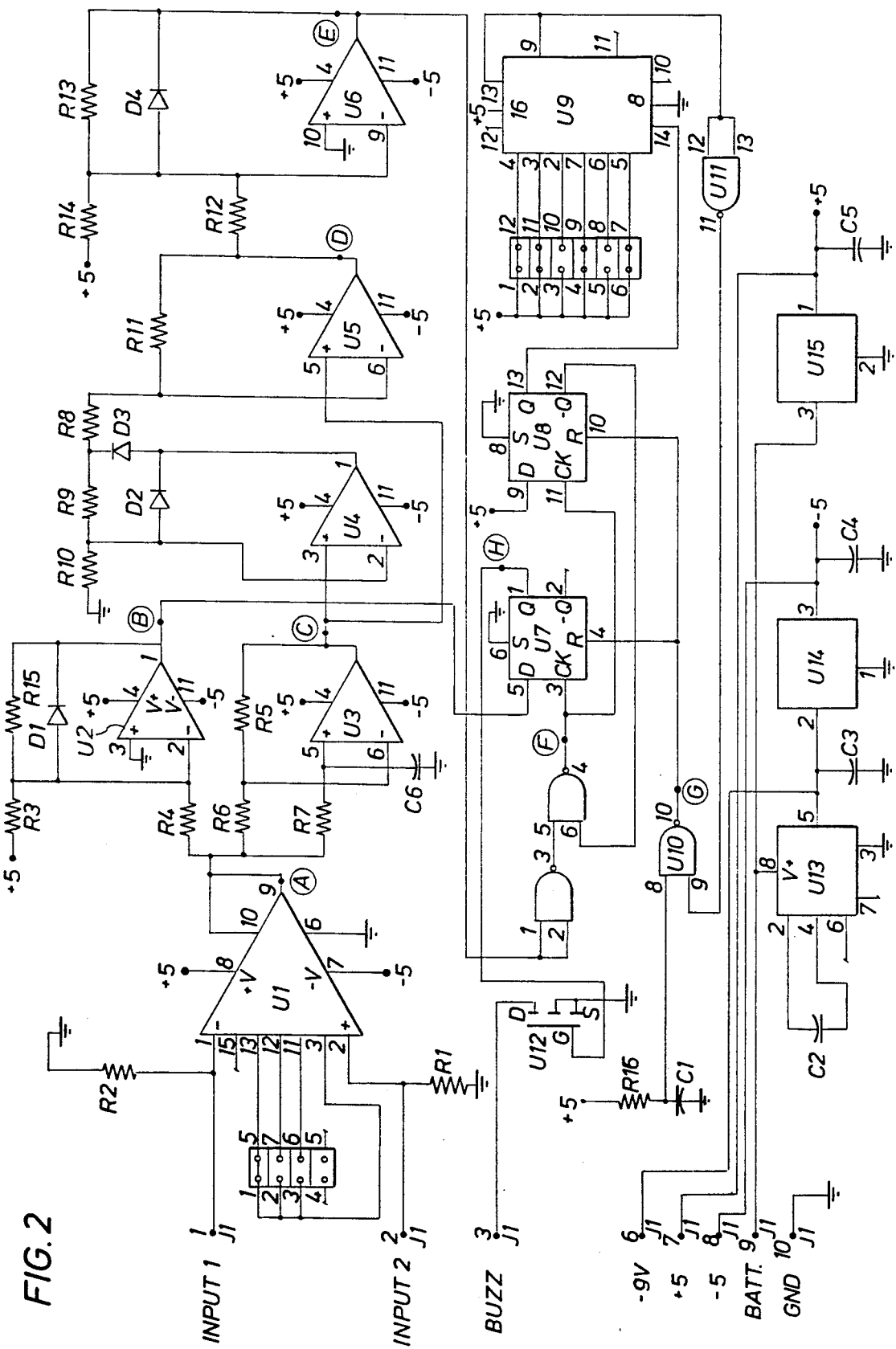
FIG. 2 is a simplified schematic diagram of the preferred geophone polarity detector of the present invention.

Referring now to FIG. 2 there may be seen a simplified schematic diagram of the presently preferred embodiment of the geophone checker of the present invention for use with geophones whether lightly or heavily damped. Circled test points A-H are depicted in FIG. 2 and the expected waveforms at these test points for a heavily damped geophone are correspondingly depicted in FIGS. 3A-3G, as described later herein. More particularly, there may be seen a preamplifier U1, which serves to invert and amplify the output voltage of a geophone and has a adjustment range of 0-60 db in 20 db steps. The amount of amplification is a function of the sensitivity of the geophone being tested (which may change from one type of geophone to another type of geophone) and the level of any background noise; the amplification should not be so great as to cause the noise to exceed the level detector threshold. A gain of 20 db is normally adequate to amplify a typical geophone output to a level which can be detected by level detector or comparator circuit U2. For a 20 db amplification, U2 may be adjusted so that U2 provides a positive output voltage of 5 volts, when the input is negative and exceeds 2.5 volts. Output from the preamplifier is phase shifted by U3 to provide a delayed geophone output, which is rectified by U4 and U5. This rectified or negative absolute value is fed to another comparator U6 which serves as a level detector. For a 20 db amplification, U6 may be adjusted so that U6 provides a positive output voltage of 5 volts, when the input is negative and exceeds 2.5 volts. U2 and U6, as well as U4 and U5, are inverting operational amplifiers. The output from the level detector U2 is used as a "D" input to flip-flop U7. The output from level detector U6 with additional gating is used as the clock "ck" input U7.

The "D" input of flip-flop U7 will be true only when the polarity is correct, but the "ck" input of U7 will go "true" whether the polarity is correct or reversed; thus, there is a simple means of determining the correct polarity. The "Q" output of U7 at pin 01 will go "true" for the proper connections but will remain "false" for reversed connections.

The "Q" output of U8 at pin 13 will go "true" anytime it gets a clock signal on its clock "ck" input at pin 11 of U8 because the "D" input at pin 09 of U8 is always true. When pin 13 of U5 goes true it starts timer U9 which is pin-programmed for a preselected delay of 0.5 seconds, although other time delays may be preselected by appropriate pin-programming of U9. When U9 has measured its preselected delay time and times out, its output at pin 9 goes true and that signal is inverted twice at gates U10 and U11 to reset the flip-flops U7 and U8. During the 0.5 second when the timer is counting, the "Q" output at pin 12 of U8 locks out any other clock pulses (i.e. any other geophone half cycles of sufficient amplitude, such as those from a lightly damped geophone) that might be generated after the first one that was detected. A power clear circuit of C1 and R16 is used to initialize the flip-flops in their reset state when power is first applied.

Output pin 01 of U7 is used as a gating signal for transistor switch U12. Transistor U12 will turn on when the polarity is correct and remain on for 0.5 seconds and then go off. If a suitable audible device (i.e. Sonalert) is connected to U12, a half second beep will sound each time the geophone is impulsed while it is properly connected. Conversely, if the polarity is incorrect, no sound will be heard when the geophone is impulsed. The time of the beep may be reduced to one-quarter of a second for heavily damped geophones. The time of the beep should be long enough to allow for the geophone signal to damp out and long enough for the operator to hear.

Voltage converter U13 generates a negative voltage level equal to the battery voltage, and plus and minus regulators U14 and U15 stabilize these to ±5 volts.

The pre-amplifier is preferably an Analog Devices AD524 instrumentation amplifier and the operational amplifiers are preferably Precision Monolithics OP-420 quad micropower op-amps. The timer is preferably an Epson 8640-A clock pulse generator and the comparator is preferably a Solid State Scientific 4013B dual D-type flip-flop. The NAND Gates are preferably Solid State Scientific 4011B quad Nand Gates and the output transistor is preferably an International Rectifier 1RFD111 hexfet transistor. The voltage converter is preferably a Maxim ICL 7660 and the voltage regulators are preferably National Semiconductor LM78L05 and LM79L-05(−5 V). The output device is preferably a Sonalert SC628 by Mallory.

FIGS. 3 A-G illustrate the various expected wave forms at the respective test points A-G indicated in the circuitry illustrated in FIG. 2 for downward motion applied to the top of a heavily damped vertical geophone whose correct positive terminal is connected to pin 1 of J1. More particularly, FIG. 3A illustrates the expected amplified output of a heavily damped vertical geophone, and corresponds to the test point marked A in FIG. 2. In particular, it may be seen that the geophone signal is inverted and the first half cycle occurs between time $T_0$ and $T_1$ and has a maximum amplitude of "SV" volts. FIG. 3B illustrates the expected output signal from level detector U2, and corresponds to the testpoint marked B in FIG. 2. In particular, it may be seen that level detector U2 provides a positive output for a negative input and has a constant voltage output as long as the signal of FIG. 3A exceeds a preselected threshold amplitude. FIG. 3C illustrates the expected phase shifted (delayed) output (by phase $\phi$) from phase shifter U3. FIG. 3D illustrates the expected output from the rectifiers (U4 and U5). In particular, it may be seen that U4 and U5 have positive and negative half cycles as input and only correspondingly shaped negative half-cycles as a output. FIG. 3E illustrates the expected output from level detector U6 and depicts two pulses. In particular, it may be seen that level detector U6 provides a positive output for a negative input and has a constant voltage output as long as the signal of FIG. 3D exceeds a preselected threshold amplitude; the leading edge of the first pulse is not precisely depicted relative to the threshold levels for the remainder of the first pulse and second pulse relative to the waveform of FIG. 3D. FIG. 3F illustrates the expected "clock" input to comparator U7 and depicts in shadow a second pulse (corresponding to the second pulse of FIG. 3E) that is rejected by the circuit depicted in FIG. 2, as described hereinbefore. FIG. 3G illustrates the expected reset signal from inverter U10 caused by timer U9.

FIGS. 4 A-D depict a representation of an oscilloscope record of actual wave forms from the circuit of FIG. 2 using the type devices described hereinbefore that resulted from a mechanical impulse applied to the top of a Geospace 40D 10 Hz (vertical) geophone connected for positive voltage on pin 1 of J1. The impulse was downward on the geophone case. FIG. 4A corresponds to FIG. 3A and depicts the amplified geophone output. FIG. 4B corresponds to FIG. 3B and depicts the output of the level detector U2. FIG. 4C depicts the signal from the output of comparator U7, i.e. input to output switch U12, and corresponds to test point H in FIG. 2. Note the phase delay between the rising edge of the signal in FIG. 4B and the rising edge of the signals in FIGS. 4C and 4D. FIG. 4D corresponds to FIG. 3E and depicts the output of level detector U6.

Thus, it may be seen that the present invention automatically determines the polarity of the geophone relative to its indicated or assumed polarity with minimal judgement or attention by an operator. The invention employs an appropriate mechanical impulse to generate a voltage from the geophone which may be amplified and then divided into two signals to provide a comparison signal and a polarity dependent signal to a comparator which may provide an appropriate output, which may be an audible and/or visible signal, when the polarity is correct.

Many other variations and modifications may be made in the apparatus and techniques hereinbefore described by those having experience in this technology without departing from the concepts of the present invention. Accordingly, it should be clearly understood that the apparatus and methods depicted in the accompanying drawings and referred to in the foregoing description are illustrative only and are not intended as limitations on the scope of the present invention.

What is claimed is:

1. A method for determining the working order and polarity of a geophone relative to its marked or assumed polarity, comprising:

generating an output signal from a geophone by mechanically impulsing said geophone in a predetermined manner, comparing said output signal and the polarity of said output signal with a preselected voltage level representative of an expected output signal and polarity from such a geophone having a polarity corresponding to said assumed polarity when such a geophone is impulsed in said predetermined manner, and generating an output responsive to said comparing step when said output signal exceeds said preselected voltage level representative of said expected output signal and polarity.

2. A method as described in claim 1, further comprising, amplifying the output signal of said geophone.

3. A method for determining the working order and polarity of a geophone relative to its marked or assumed polarity, comprising:

generating an output signal from a geophone by mechanically impulsing said geophone in a predetermine manner, amplifying the output signal of said geophone, dividing said amplified output signal into a first and second signal, delaying and rectifying said first signal, comparing said second signal with a preselected voltage level and polarity, said preselected voltage and polarity being representative of an expected output signal and polarity from such a geophone having a polarity corresponding to an assumed polarity when such a geophone is impulsed in said predetermined manner and generating a third signal when said second signal exceeds said preselected voltage level and matches said preselected polarity, comparing the polarity of said third signal and said rectified first signal and generating a fourth signal if said polarities are the same, and generating a final signal responsive to the generation of said fourth signal, for a preselected time to indicate said output signal and polarity substantially conform to said expected output signal and polarity.

4. A method as described in claim 2, wherein said geophone is a heavily damped geophone, and wherein, said comparing step includes comparing said amplified output signal with a preselected voltage level and preselected polarity, said preselected voltage level and preselected polarity being representative of said expected output signal and polarity, and generating a second signal when said amplified output signal exceeds said preselected voltage level and matches said preselected polarity, and said generating an output responsive step includes generating a final signal responsive to the generation of said second signal, for a preselected time.

5. A method for determining the polarity of a geophone relative to its marked or assumed polarity, comprising:

generating an output voltage from such a geophone by mechanically impulsing such a geophone, amplifying said output voltage, dividing said amplified output voltage into a first and second signal, delaying and rectifying said first signal, comparing said delayed and rectified first signal with first preselected voltage level and generating a third signal when said delayed and rectified first signal exceeds said first preselected voltage level, comparing said second signal with a second preselected voltage level and preselected polarity and generating a fourth signal when said second signal exceeds said second preselected voltage level and matches said preselected polarity, comparing said third and fourth signals and generating a fifth signal when said third and fourth signals are both present, and generating a final signal responsive to said fifth signal, for a preselected time.

6. Apparatus for determining the working order and polarity of a geophone relative to its marked or assumed polarity, comprising:

means for comparing an output signal and the polarity thereof from a geophone mechanically impulsed in a predetermined manner with a preselected voltage level representative of an expected output signal and polarity from such a geophone having a polarity corresponding to said assumed polarity impulsed in said predetermined manner, and means for generating an output responsive to said means for comparing when said output signal and polarity exceed said preselected voltage level representative of said expected signal and polarity for such a geophone.

7. The apparatus as described in claim 6, wherein said geophone is a heavily damped geophone, further comprising:

means for amplifying said geophone output signal, and wherein said means for comparing includes a level detector connected to the output of said means for amplifying, said level detector having a preselected voltage level and a polarity, said preselected voltage and polarity being representative of an expected output signal and polarity from such a geophone having a polarity corresponding to an assumed polarity when such a geophone is impulsed in said predetermined manner, and wherein said means for generating an output responsive includes an output responsive amplifier connected to and responsive to said level detector for providing an output responsive signal when said amplified output signal exceeds said preselected voltage level and matches said preselected polarity, a timer connected to said output responsive amplifier for maintaining said output responsive signal from said output responsive amplifier for a preselected period of time, and an output device connected to said output responsive amplifier and responsive to said output responsive signal.

8. An apparatus for determining the working order and polarity of a geophone relative to its marked or assumed polarity, comprising:

means for amplifying an output signal from a geophone mechanically impulsed in a predetermined manner, means for dividing said amplified output signal into a first and second signal, means for delaying and rectifying said first signal, means for comparing said delayed and rectified first signal with a preselected voltage level and generating a third signal when said delayed and rectified first signal exceeds said preselected voltage level, means for comparing said second signal with a preselected voltage level and preselected polarity, said preselected voltage and polarity being representative of an expected output signal and polarity from such a geophone having a polarity corresponding to an assumed polarity when such a geophone is impulsed in said predetermined manner, and generating a fourth signal when said second signal exceeds said preselected voltage level and matches said preselected polarity, and means for comparing said third and fourth signals and generating a fifth signal if said third and fourth signals are both present, and means for generating a final signal responsive to the generation of said fifth signal for a preselected time indicating said output signal and polarity are substantially the same as said expected signal and polarity for such a geophone.

9. Apparatus for determining the polarity of a geophone relative to its marked or assumed polarity, comprising:

an amplifier of adjustable amplifications connectable to such a geophone in accordance with said marked or assumed polarity for such a geophone to amplify the output signal of such a geophone, a phase shifter connected to the output of said amplifier, a first level detector connected to the output of said amplifier, a rectifier connected to the output of said phase shifter, a second level detector connected to the output of said rectifier, a comparator having the outputs of said first and second level detectors as its two inputs, an output switch connected to and responsive to said comparator for providing an output signal, a timer connected to said comparator for maintaining an output signal from the output switch for a preselected period of time, and a output device connected to said output switch and responsive to said output signal.

* * * * *